United States Patent
Yamazaki et al.

(10) Patent No.: US 6,723,949 B2
(45) Date of Patent: Apr. 20, 2004

(54) LASER BEAM MACHINE

(75) Inventors: Tsunehiko Yamazaki, Aichi-ken (JP); Naoomi Miyagawa, Gifu-ken (JP); Toshihiko Inoue, Aichi-ken (JP); Hikaru Iryoda, Aichi-ken (JP)

(73) Assignee: Yamazaki Mazak Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/452,098

(22) Filed: Jun. 2, 2003

(65) Prior Publication Data

US 2003/0222058 A1 Dec. 4, 2003

(30) Foreign Application Priority Data

Jun. 3, 2002 (JP) .......................................... 2002-161391

(51) Int. Cl.[7] ............................................... B23K 26/38
(52) U.S. Cl. ............................ 219/121.61; 219/121.67; 219/121.79
(58) Field of Search ........................ 219/121.61, 121.62, 219/121.67, 121.72, 121.78, 121.79, 121.81, 121.82, 121.83

(56) References Cited

U.S. PATENT DOCUMENTS

| | | | | |
|---|---|---|---|---|
| 5,192,848 A | | 3/1993 | Miyakawa et al. | .... 219/121.82 |
| 5,585,018 A | * | 12/1996 | Kanaoka et al. | ....... 219/121.72 |
| 5,910,260 A | * | 6/1999 | Gerber | ................... 219/121.67 |

* cited by examiner

*Primary Examiner*—Samuel M. Heinrich
(74) *Attorney, Agent, or Firm*—Duane Morris LLP

(57) ABSTRACT

A sharp corner judgment means judges as to whether a corner of cut shape in a workpiece is a sharp corner is not on the basis of a machining program. When the corner is regarded as the sharp corner, an additional locus producing means for producing sharp corner produces an additional locus for producing sharp corner when machining on the corner regarded as the sharp corner, and a sharp corner machining execution means executes machining on the corner on the basis of the produced additional locus for producing sharp corner. Then, the additional locus for producing sharp corner can be automatically produced for the sharp corner so as to execute machining.

10 Claims, 7 Drawing Sheets

(a)

(b)

(a)

(b)

(a)

(b)

ated cut path L5. This method is adopted in order to prevent the sharp corner from not being cut in a desired shape for the reason that a workpiece 70 is overheated with laser beam so as to be melted when feed speed F temporarily becomes zero at the time of passing through position P1 by the torch. This machining method is executed by a machining program PRO which is comprised of a plurality of machining steps PS1, PS2, . . . , as shown in FIG. 7(*b*). In the machining program PRO, a loop R program LRP for circling on the above-mentioned loop R (LR) is inserted between machining steps PS, PS5.

LASER BEAM MACHINE

BACKGROUND OF THE INVENTION

The present invention relates to a laser beam machine for executing cutting machining on a workpiece in the shape of a plate.

FIG. 7 is a view showing how to cut a corner portion according to a conventional machining method wherein (a) is a view showing loop R of movement path, and (b) is a view showing a part of a machining program.

In order to cut a sharp corner formed by crossing straight lines of cut paths with a laser beam machine in a conventional method, for instance, in order to cut a sharp corner formed by crossing cut paths L1 and L5 (full line), which are straight lines, at position P1 (x coordinate is 0, y-axis coordinate is 0) as shown in FIG. 7(*a*), cut path L1 is cut in an arrow direction as shown in FIG. 7(*a*), and thereafter, the sharp corner is cut, circling outside the cut shape along loop R (LR) as shown by a broken line, passing through positions P1, P100 (x coordinate is 5, y-axis coordinate is 0), P101(x coordinate is 0, y-axis coordinate is 5) in order, without immediately cutting cut path L5. This method is adopted in order to prevent the sharp corner from not being cut in a desired shape for the reason that a workpiece 70 is overheated with laser beam so as to be melted when feed speed F temporarily becomes zero at the time of passing through position P1 by the torch. This machining method is executed by a machining program PRO which is comprised of a plurality of machining steps PS1, PS2, . . . , as shown in FIG. 7(*b*). In the machining program PRO, a loop R program LRP for circling on the above-mentioned loop R (LR) is inserted between machining steps PS, PS5.

That is, linear interpolation instruction (G01) where feeding speed F is 30,000 mm/min, and end point is position PI is instructed in block N1 of the first machining step PS1 of the top in the figure, and linear interpolation instruction (G01) of moving 50 mm in a negative direction of y-axis from position P1 is instructed in block N5 of the fifth machining step PS5 of the bottom. And, the above-mentioned loop R program LRP is inserted before block N5.

The loop R program LRP is comprised of three blocks N2, N3, and N4 of machining steps PS2, PS3 and PS4, as shown in FIG. 7(*b*). In the first block N2, linear interpolation instruction (G01) of moving 5 mm in a positive direction of x-axis along movement path S1 to end position P100 in order to elongate cut path L1, maintaining the feeding speed F, is instructed. When a torch reaches position P100, arc interpolation instruction (G03) of arc R1, connecting with both extended lines of cut paths L1 and L5, having 5 mm of radius R determined on the basis of a predetermined acceleration by which the feed speed F can be maintained, is instructed in the second block N3. When the torch reaches position P101, linear interpolation instruction (G01) of moving 5 mm in a negative direction of y-axis along movement path S2 to end position P1 in order to elongate cut path L5, maintaining the feeding speed F, is instructed in the last block N4. When returns to position P1, the loop R program LRP finishes, and linear interpolation instruction (G01) of moving 50 mm in a negative direction of y-axis is instructed in block N5 of machining step PS5, so as to continue cutting machining along cut shape of cut path L5, maintaining feed speed in cut path L1.

The torch moves along the loop R (LR) comprised of straight line S1, arc R1 and straight line S2, so that cutting machining is possible at the same feed speed F at any position in a cut shape, irrespective of a sharp corner. Therefore, the workpiece 70 can be cut in a desired cut shape by cutting a sharp corner, maintaining a good cut face having no machining irregularity.

In the above-mentioned machining method, it is necessary to move the torch along a movement path which is comprise of a straight line, an arc and a straight line every machining on the sharp corner, so that the time for circling on the movement path at a predetermined feed speed prevents speedy machining. In case where there are many sharp corners to be machined, such as a case where parts having a sharp corner in great number are located on the workpiece 70 (nesting), or such a case where parts to be cut have many sharp corners, the machining efficiency is lowered owing to increased number of circling, and it is further difficult to actualize speedy machining thereby.

Furthermore, it is necessary to insert the loop R program LRP having three blocks according to a straight line, an arc and a straight line every machining block of the sharp corner when producing a machining program. Therefore, longer time is necessary for such insertion, and more specifically, much work is necessary in case where many sharp corners are machined. Besides, program capacity for the loop R program LRP is also necessary according to the number of the sharp corner. More inconveniently, bigger locus of loop R to be inserted into a corner leads to meaningless cutting of a material, and nesting efficiency is lowered thereby.

Under these circumstances, the development of the laser beam machine for cutting a sharp corner on the basis of a desired cut shape, maintaining a good cut face having no machining irregularity, capable of actualizing speedy cutting machining in an easy way, has been desired.

SUMMARY OF THE INVENTION

A laser beam machine of the invention has:

a radiating means for radiating laser beam on a workpiece to be cut;

a means for moving and driving, for moving and driving the radiating means at predetermined feed speed;

a machining execution means for moving and driving the radiating means through the means for moving and driving on the basis of a movement instruction instructed by a machining program;

a sharp corner judgment means for judging as to whether a corner of cut shape in the workpiece is a sharp corner or not on the basis of the machining program;

additional locus producing means for producing sharp corner, for producing additional locus for producing sharp corner when machining a corner which is judged as the sharp corner by the sharp corner judgment means; and a sharp corner machining execution means for machining the corner judged as the sharp corner on the basis of the additional locus for producing sharp corner produced by the additional locus producing means for producing sharp corner.

According to an aspect of the invention, an additional locus for producing sharp corner is automatically produced when machining on a corner judged as a sharp corner, and the corner is machined on the basis of the additional locus for producing sharp corner. Therefore, the sharp corner can be easily machined, maintaining a good cut face having no machining irregularity without spending longer time for programming for machining. More specifically, in case where there are many sharp corners to be machined, producing of machining program can be further lightened. Besides, more conveniently, it is not necessary to increase program capacity for machining on the sharp corner.

According to an another aspect of the invention, the sharp corner machining execution means can control feed speed of the radiating means so as to move the radiating means, decelerating feed speed from the feed speed before entering into the sharp corner, from passing of the corner till returning to the corner by the radiating means.

In this case, the additional locus for producing sharp corner shorter than a conventional locus can be produced when machining on the sharp corner since the torch moves, reducing feed speed from passage of laser beam on a corner judged as the sharp corner till return to the corner. Then, speedy machining can be realized, maintaining a good cut face having no machining irregularity. In case where there are many sharp corners to be machined, more speedy machining is possible. Besides, meaningless cutting of a material is saved by shortening the locus so as to improve nesting efficiency.

According to an another aspect of the invention, a sharp corner machining execution judgment means for judging as to whether a machining execution instruction of the sharp corner is instructed in the machining program or not is provided, whereby machining on the corner is executed by the sharp corner machining execution means when the sharp corner machining execution judgment means judges that the machining execution instruction of the sharp corner is instructed in the machining program.

In this case, as to whether sharp corner machining is instructed in a machining program or not is judged, and the corner is machined on the basis of the additional locus for producing sharp corner when the judgment is that the execution instruction is instructed. Then, an operator can freely select one of two options, that is, an operator executes automatic machining on the sharp corner using the additional locus producing means for producing sharp corner, or manually inserts a machining block in the machining program in a conventional way, so that the machining contents can be made flexible.

According to an another aspect of the invention, a laser beam radiation control means for controlling radiation of the laser beam on the workpiece from the radiating means is provided, whereby no laser beam is radiated on the workpiece through the radiating means by the laser beam radiation control means while the sharp corner machining execution means moves and drives the radiating means along the additional locus for producing sharp corner.

In this case, no laser beam is radiated on the workpiece during movement of the moving means along the additional locus for producing sharp corner, so that meaningless cutting of a material can be saved and nesting efficiency can be improved thereby.

DESCRIPTION OF THE PREFERRED EMBODIMENTS

Figure 1:
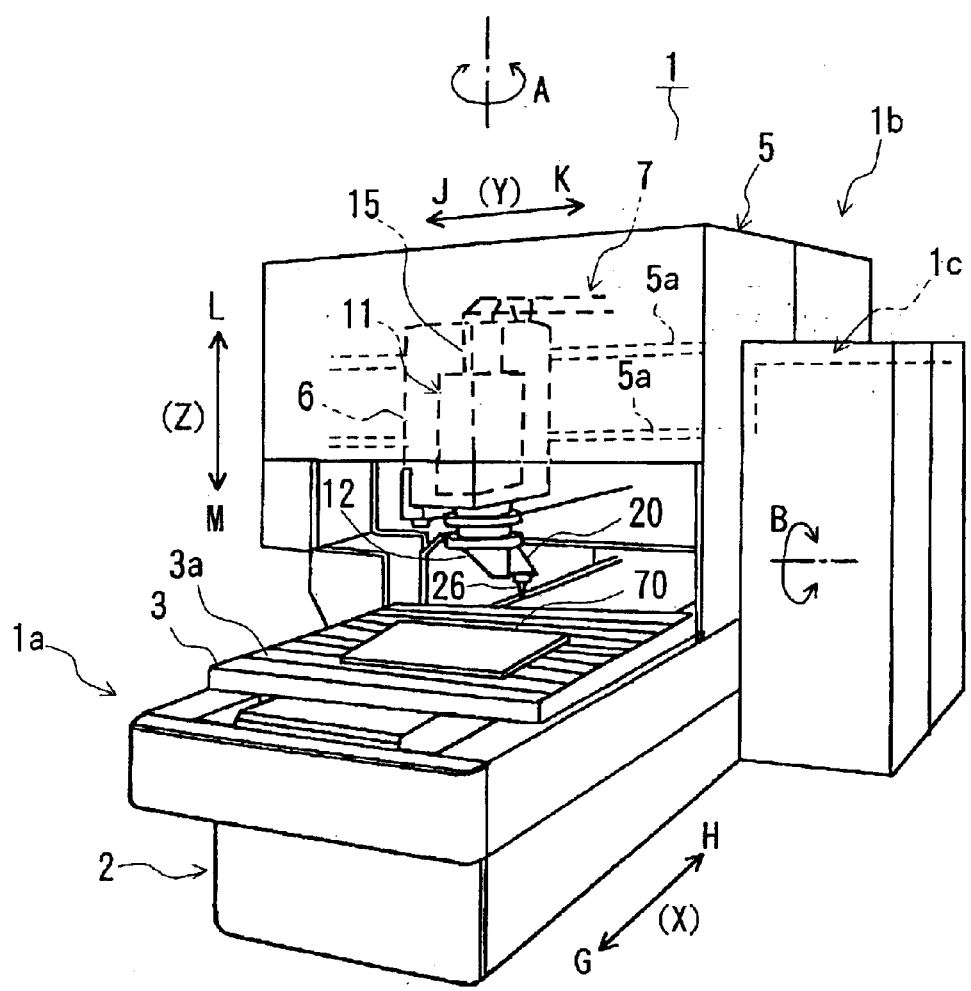
FIG. 1 is a perspective view showing an instance of a laser beam machine to which the invention is applied.
Figure 2:
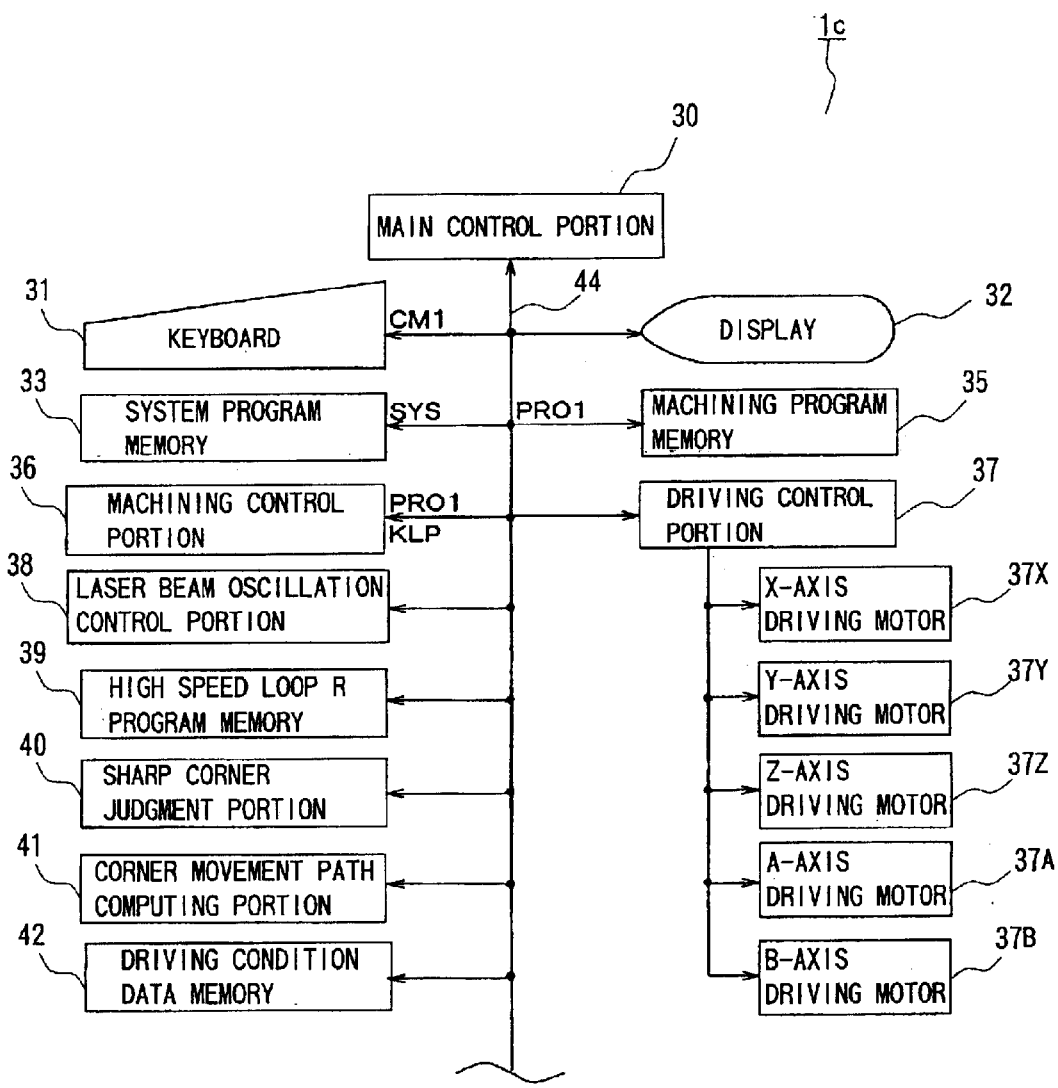
FIG. 2 is a block diagram showing a control unit of the laser beam machine of FIG. 1.
Figure 3:
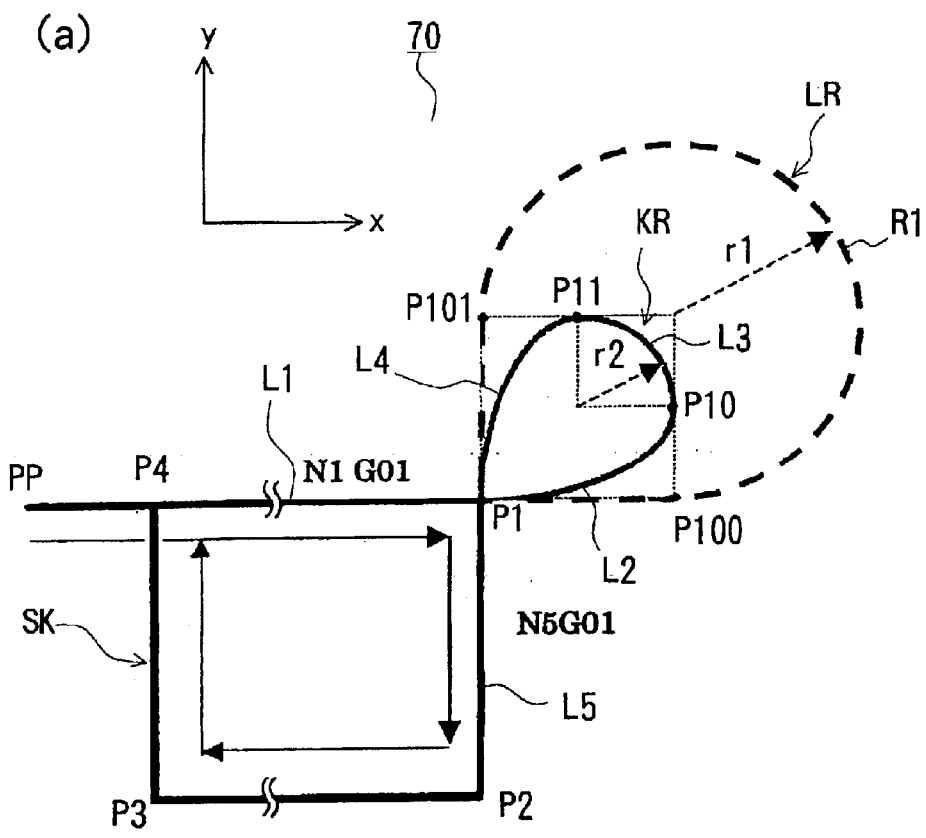
FIG. 3 is a view for explaining cutting on a corner portion of a workpiece, wherein (a) is a view showing high speed loop R of a movement path, and (b) is a view showing an instance of a machining program.
Figure 3:
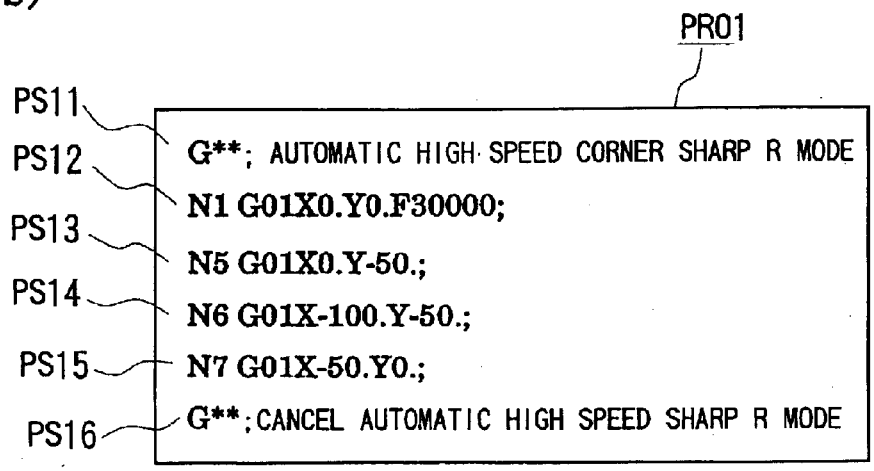
Figure 4:
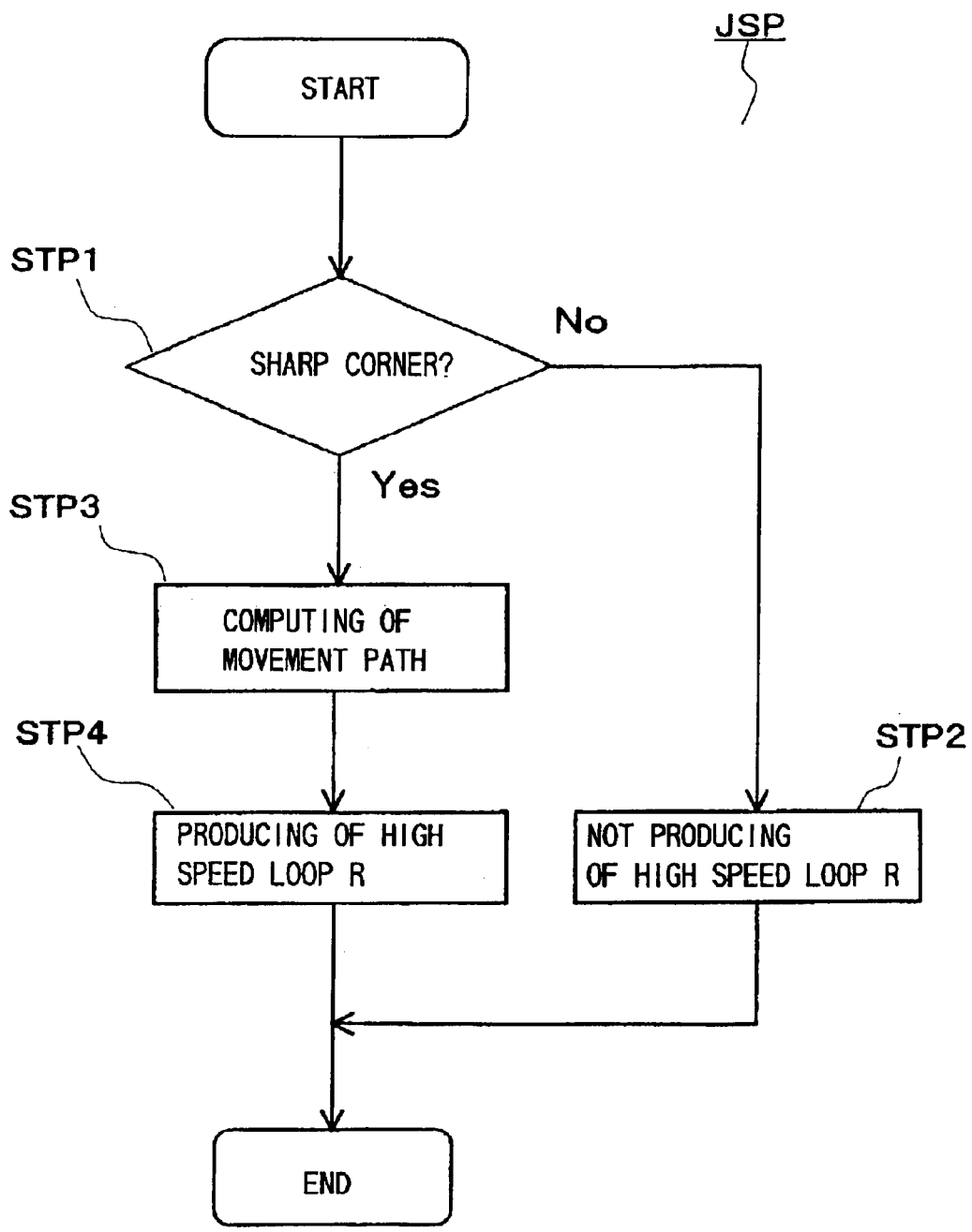
FIG. 4 is a flowchart showing contents of an automatic producing program JSP which is sub-routine of a high speed loop R program.
Figure 5:
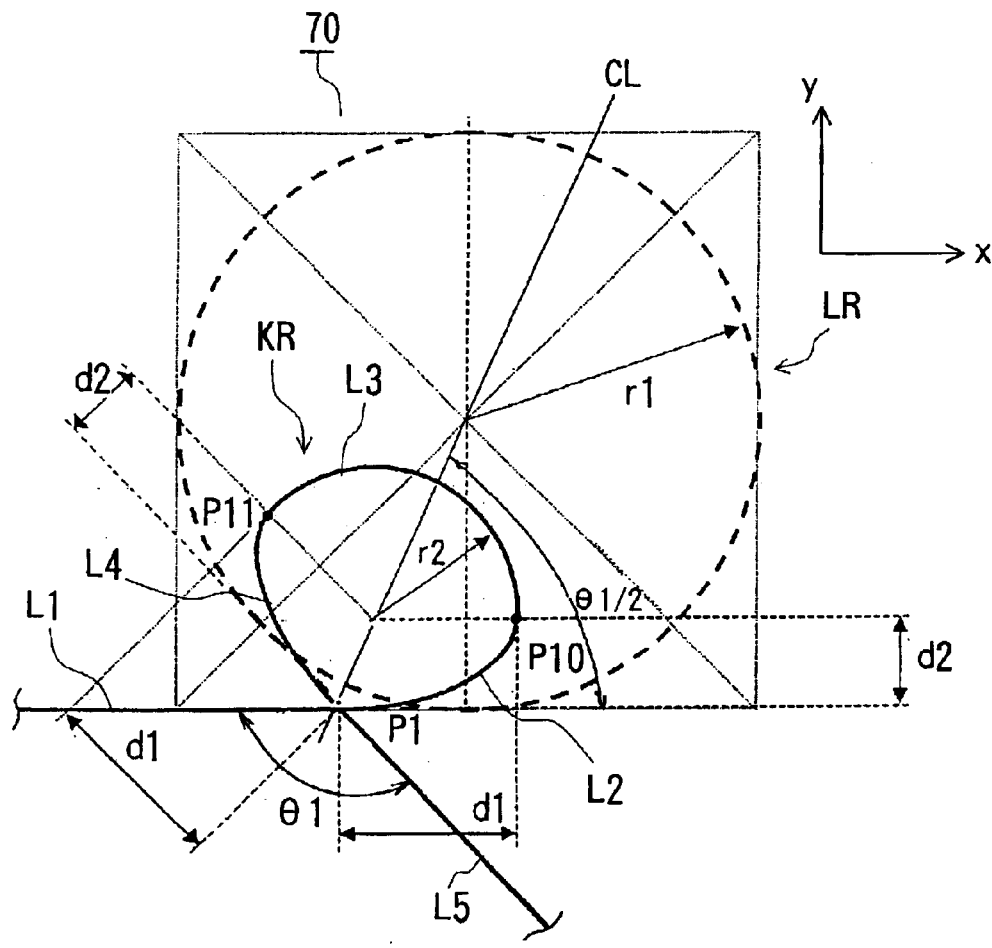
FIG. 5 is an explanation view when executing a high speed loop R program wherein (a) is an explanation view when computing the high speed loop R, and (b) is a view showing circling movement of a torch along the high speed loop R.
Figure 5:
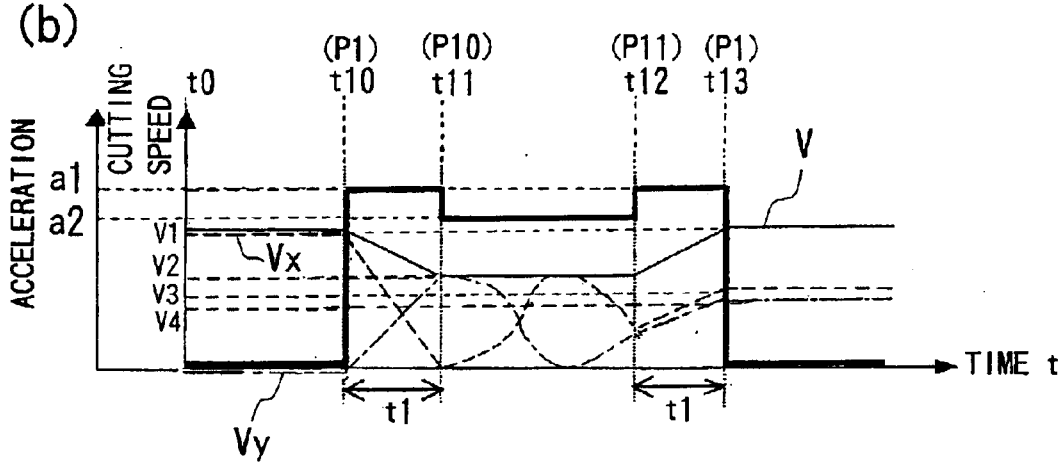
Figure 6:
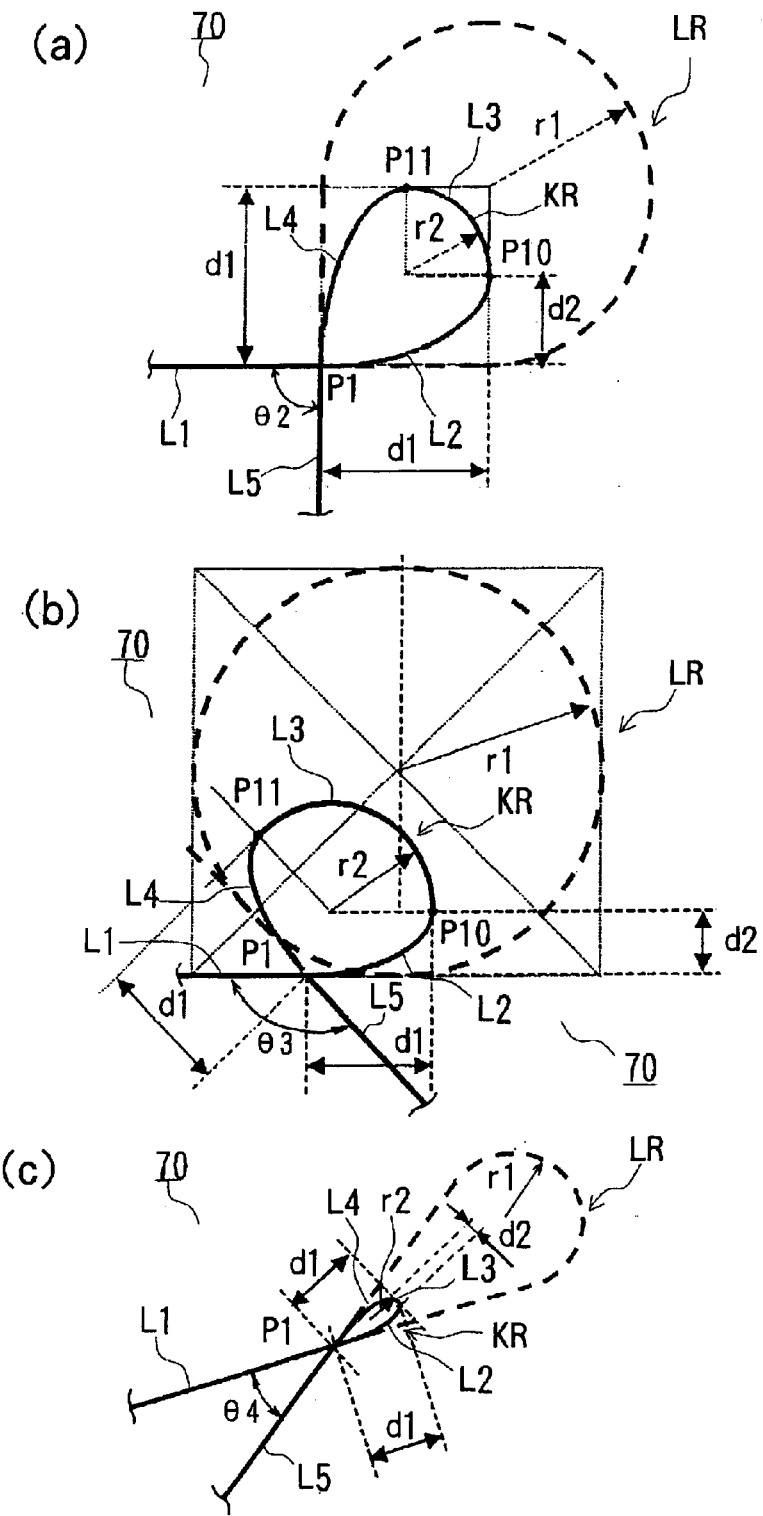
FIG. 6 is a view showing each cut path on the basis of a corner angle.

FIG. 1 is a perspective view showing an instance of a laser beam machine to which the invention is applied, FIG. 2 is a block diagram showing a control unit of the laser beam machine of FIG. 1, FIG. 3 is a view for explaining cutting on a corner portion of a workpiece, wherein (a) is a view showing high speed loop R of a movement path, and (b) is a view showing an instance of a machining program, FIG. 4 is a flowchart showing contents of an automatic producing program JSP which is sub-routine of a high speed loop R program, FIG. 5 is an explanation view when executing a high speed loop R program wherein (a) is an explanation view when computing a movement path, and (b) is a view showing circling movement of a torch along the high speed loop R, and FIG. 6 is a view showing each cut path on the basis of a corner angle.

A laser beam machine 1 to which the invention is applied is a CNC unit for machining (NC cutting machine), for instance, as shown in FIG. 1. The laser beam machine 1 is comprised of a workpiece stationing unit 1a, a laser beam radiating unit 1b and a control unit 1c. The laser beam radiating unit 1b is located on the workpiece stationing unit 1a, and the control unit 1c is provided, attaching to the workpiece stationing unit 1a and the laser beam radiating unit 1b.

The workpiece stationing unit 1a has a base 2 and a table 3, as shown in Fig. 1. The base 2 fixes the laser beam machine 1 on a floor, and the table 3 is located thereon. The table 3 has a horizontal workpiece location surface 3a for putting the workpiece 70 thereon, and freely moves in a direction as shown by arrows G and H (X-axis direction) as shown in FIG. 1 with respect to the base 2.

And, the laser beam radiating unit 1b has a column 5, a saddle 6 and a machining head body 11, as shown in FIG. 1. The column 5 is fixed on the base 2, bridging over the table 3 which can move in the X-axis direction so as not to interfere with the table 3. And, the column 5 has rails for saddle 5a, 5a along a direction as shown by arrows J and K perpendicular to and horizontal to the X-axis direction (a Y-axis direction), and the saddle 6 freely moves and drives in the Y-axis direction with respect to the base 2 through the rails for saddle 5a, 5a. In the above-mentioned explanation, the table 3 moves in the X-axis direction, but the present invention is not limited to such a structure as long as the saddle 6 can be relatively moved and driven with respect to the base 2 in the X-axis direction and the Y-axis direction. The saddle 6 may freely move in the X-axis direction and the Y-axis direction and the table 3 may be fixed.

The column 5 has a laser beam oscillator (not shown) for outputting laser beam. The laser beam oscillator and the saddle 6 are connected with each other through a proper laser beam path tube 7 which freely moves and expands together with the movement of the saddle 6 in they direction, as shown in FIG. 1. Furthermore, the laser beam path tube 7 is connected with the machining head body 11 provided inside the saddle 6 through an optical path tube for saddle 15 formed, similar to the laser beam path tube 7.

Any type of laser beam oscillator is available as long as the oscillator can stably radiate predetermined output of laser beam with which the workpiece 70 comprised of metal can be cut and bored. For instance, a $CO_2$ laser beam oscillator, YAG laser beam oscillator or excimer laser beam oscillator can be applied to the present invention.

The machining head body 11 has a sleeve member 12, a top end member 20, and a torch 26, as shown in FIG. 1, and freely moves and drives with respect to the saddle 6, being perpendicular to the X-axis direction and the Y-axis direction, that is, in a direction as shown by arrows L and M (Z-axis direction). That is, the machining head body 11 is provided, being free to be moved and driven with respect to the base 2 in the Z-axis direction through the saddle 6 and the column 5. The torch 26 is connected with the sleeve member 12 through the top end member 20 so as to be freely rotated, driven and positioned in an A-axis direction and a B-axis direction with the Z-axis and the Y-axis as their centers. That is, the torch 26 freely moves and drives in the X-axis, the Y-axis and the Z-axis directions with respect to the workpiece 70 to be put on the workpiece location surface 3a, and freely rotates, drives and is positioned in the A-axis direction and the B-axis direction. And, an optical path is set with a reflecting mirror (not shown) or the like, so that laser beam outputted from a laser beam oscillator can be radiated from a top end of the torch 26 through the laser beam path tube 7, the optical path tube for saddle 15, the machining head body 11, the sleeve member 12, and the top end member 20. In the above-mentioned explanation, the respective portions of the laser beam machine 1 can be moved, rotated and driven in the X-axis, Y-axis, Z-axis, A-axis, B-axis directions. But, the present invention is not limited to such a structure. The laser beam machine 1 having any axial structure is also available as long as the torch 26 can be moved and driven at least on a plane with respect to the workpiece 70.

The control unit 1c of the laser beam machine 1 has a main control portion 30, as shown in FIG. 2. A keyboard 31, a display 32, a system program memory 33, a machining program memory 35, a machining control portion 36, a driving control portion 37, a laser beam oscillation control portion 38, a high speed loop R program memory 39, a sharp corner judgment portion 40, a corner movement path computing portion 41, and a driving condition data memory 42 are connected with the main control portion 30 via a bus line 44. And, a X-axis driving motor 37X for moving and driving the table 3 in the X-axis direction, and a Y-axis driving motor 37Y and a Z-axis driving motor 37Z for respectively moving and driving the saddle 6 in the Y-axis direction and the machining head body 11 in the Z-axis direction are connected with the driving control portion 37. Furthermore, an A-axis driving motor 37A and a B-axis driving motor 37B for respectively rotating, driving and positioning the torch 26 in the A-axis direction and the B-axis direction are connected with the driving control portion 37.

In order to machine the workpiece 70 in the shape of a plate using the laser beam machine 1 having the above-mentioned structure, an operator (worker) firstly puts the workpiece 70 to be machined on the workpiece location surface 3a as shown in FIG. 1. And, an operator inputs a booting instruction through a booting switch (not shown) owned by the control unit 1c. Receiving this instruction, the main control portion 30 reads a system program memory SYS out of the system program memory 33, and thereafter, processing proceeds according to the read system program SYS.

Subsequently, the main control portion 30 displays a scope (not shown) for inviting to produce a machining program PRO1 on the display 32. An operator produces the machining program PRO1 according to a cut shape through the keyboard 31 on the basis of the scope displayed. In case of a cut shape SK which is a rectangle where their apexes are positions P1, P2, P3 and P4 as shown in FIG. 3(a), an operator produces the machining program PRO1 as shown in FIG. 3(b).

The machining program PRO1 is comprised of a plurality of machining steps PS11, PS12, . . . PS16 on the basis of G code (the code showing instruction for determining a function mode in a laser beam machine, such as kind of interpolation). Blocks N1, N5, N6 and N7 of the machining steps PS12 through PS15 of the machining program PRO1 instruct linear interpolation instruction (G01) to linearly move the torch 26 at feed speed F of F30,000 mm/min from a piercing point PP (a machining start position) to the positions P1, P2, P3 and P4 in order along an arrow, as shown in FIG. 3(a). And, a high speed loop R instruction of the machining step PS11 is inserted in the top of the machining program PRO1 and a cancel instruction of machining step PS16 is inserted in the bottom so as to sandwich the above-mentioned four machining steps between both steps.

The high speed loop R instruction of machining step PS11 instructs to start a high speed loop R program KLP described hereinafter by a dedicated G code (G** as shown in FIG. 3(a)) of a predetermined group number, and the cancel instruction of machining step PS16 instructs to finish the high speed loop R program KLP by a predetermined dedicated G code. The high speed loop R instruction is a modal instruction, and the processing of the high speed loop R program KLP continues till the cancel instruction in this instruction. That is, subsequent machining steps PS12 through P15 are executed on the basis of the high speed loop R program KLP.

When finishing producing of the machining program PR01, an operator inputs a predetermined signal through the keyboard 31. Receiving this, the main control portion 30 stores the machining program PRO1 produced in the machining program memory 35. When an operator inputs an execution instruction CM1 of the machining program PRO1 through the keyboard 31, the main control portion 30 receiving the instruction CM1, reads out the stored machining program PRO1 and instructs the machining control portion 36 to execute the machining program PRO1. Then, the machining control portion 36 interprets and executes the machining steps PS11 through PS16 of the machining program PRO1, in order starting from the top step so as to execute the machining program PRO1.

Figure 7:
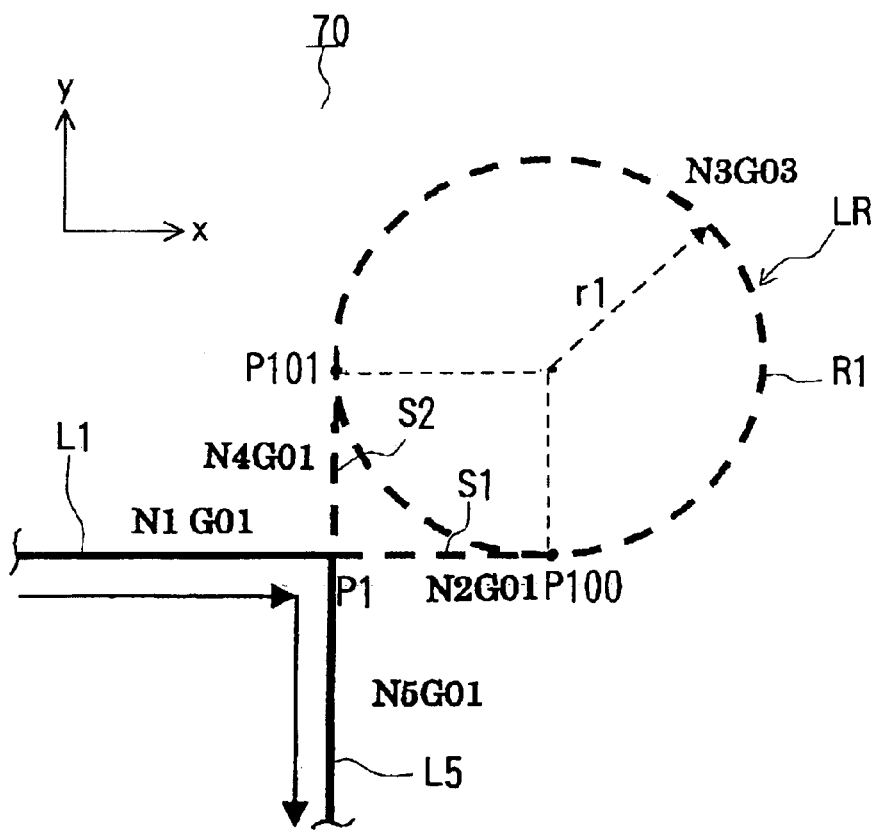
FIG. 7 is a view showing how to cut a corner portion according to a conventional machining method wherein (a) is a view showing loop R of movement path, and (b) is a view showing a part of a machining program.
Figure 7:
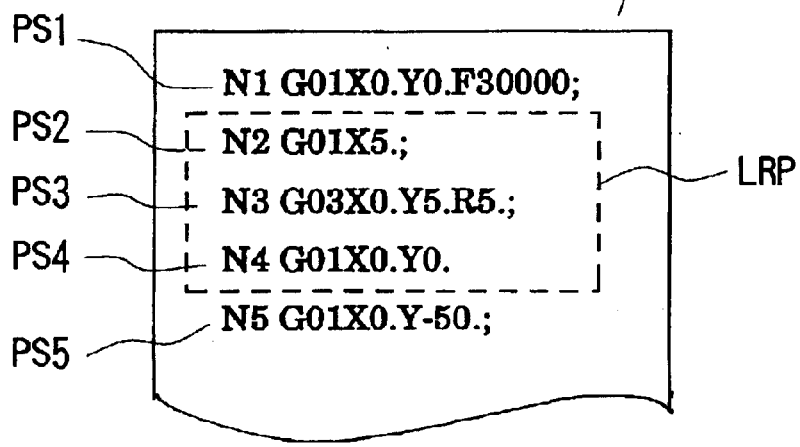

The top machining step PS11 is the high speed loop R instruction. So, the main control portion 30 reads the high speed loop R program KLP out of the high speed loop R program memory 39. By this high speed loop R program KLP, a high speed loop R (KR) described hereinafter is automatically produced as additional locus for producing sharp corner every sharp corner between both succeeding machining steps in the subsequent machining steps PS12, PS13, . . . . The additional locus for producing sharp corner is the locus such as a loop R (LR) as shown in FIG. 7(a), to be specifically added, succeeding to a corner, in order to deteriorate machining efficiency of a corner portion owing to the decrease of machining speed with laser beam in the corner where linear paths cross each other, that is, in a sharp corner. Then, the main control portion 30 judges in advance as to whether the corner between both succeeding machining steps is a sharp corner or not concerning all corners in the cut shape SK on the basis of the high speed loop R program KLP.

The sharp corner is a corner where the angle between both lines in a cut shape (such as both straight lines, a straight line and a curved line, or both curved lines) (corner angle θ) is a predetermined angle (0°<θ<180°, for instance), and as to whether the corner machined by the machining step is the sharp corner where straight paths cross each other or not is judged on the basis of a kind of interpolation of both succeeding machining steps (such as linear interpolation and arc interpolation), and a coordinate (such as coordinates of a start point and an end point and a center coordinate of arc interpolation).

In the embodiment, the main control portion 30 judges as to whether the corner between machining steps PS12 and PS13, the corner between machining steps PS13 and PS14, and the corner between machining steps PS14 and PS15, that is, the positions P1, P2 and P3 are sharp corners or not, and since any machining step is a linear interpolation instruction (G01), the judgment is that any corner is the sharp corner where both straight lines cross each other at the corner angle 90°, as known from the coordinates of each start point and each end point. Furthermore, the main control portion 30 hangs out a flag showing that the corner is the sharp corner, corresponding to the corner between the respective machining steps, on the basis of the above-mentioned judgment result.

And, the program proceeds to machining step PS12 and linear interpolation instruction (G01) where the feed speed F is 30,000 mm/min and the end point is the position P1 (x coordinate is 0, y coordinate is 0) is executed in block Ni. Firstly, the machining control portion 36 instructs the driving control portion 37 to move to the piercing point PP as shown in FIG. 3(*a*). Receiving this instruction, the driving control portion 37 transmits a predetermined signal to the X-axis driving motor 37X and the Y-axis driving motor 37Y so as to move the torch 26 to the piercing point PP. And, the machining control portion 36 instructs the laser beam oscillation control portion 38 to output laser beam and instructs the driving control portion 37 to move to the end point P1, and the driving control portion 37 transmits a predetermined signal to the X-axis and Y-axis driving motors 37X and 37Y (a predetermined signal is transmitted to only the X-axis driving motor 37X when the X-axis as shown in FIG. 3(*a*) and the X-axis as shown in FIG. 1 correspond with each other). Laser beam is then radiated by the torch 26, and cutting on the workpiece 70 is started by linear movement to position P1 in the positive direction on the x-axis along cut path L1.

The main control portion 30 executes the automatic producing program JSP which is a sub routine of the high speed loop R program KLP during the cut machining so as to automatically produce the high speed loop R (KR) concerning the corner between the machining steps PS12 and PS13.

The automatic producing of the high speed loop R (KR) on the basis of the automatic producing program JSP is now explained, referring to steps STP1 through STP4 as shown in FIG. 4.

In step STP1, the main control portion 30 instructs the sharp corner judgment portion 40 to judge as to whether the corner between both succeeding machining steps is the sharp corner or not. Receiving this instruction, the sharp corner judgment portion 40 judges as to whether the corner between both succeeding machining steps is the sharp corner or not on the basis of the flag showing the sharp corner. If the judgment is no sharp corner (No of step STP1), the effect is transferred to the main control portion 30, and the program enters in step STP2. The main control portion 30 finishes the automatic producing program JSP without automatically procuring the high speed loop R (KR), and the machining control portion 36 executes the next machining step.

If the judgment by the sharp corner judgment portion 40 is being a sharp corner (Yes of step STP1), the effect is transferred to the main control portion 30. The main control portion 30 instructs the corner movement path computing portion 41 to compute a movement path of the high speed loop R (KR) as the additional locus for producing sharp corner in step STP3. Receiving this instruction, the corner movement path computing portion 41 computes the movement path. In the embodiment, the sharp corner judgment portion 40 judges that the corner between the machining steps PS12, PS13 is the sharp corner on the basis of the above-mentioned flag (Yes of step STP1), and the corner movement path computing portion 41 computes the movement path of the high speed loop R (KR) in the corner between the machining steps PS12 and PS13.

That is, the high speed loop R (KR) in the corner between the machining steps PS12, PS13 is a path of the torch 26 where the crossing point between cut paths L1 and L5 (the position P1) is a start point and an end point, circling outside the cut shape SK, as shown in FIG. 3(*a*), and is comprised of movement paths L2, L4 which are parabolas and movement path L3 having radius r2 smaller than radius r1 of the conventional arc R1. The whole high speed loop R has almost ellipse shape since the path between cut path L1 and movement path L2, between cut path L5 and movement path L4, and between movement paths L2, L4 and movement path L3 has smooth connection.

Furthermore, how to compute the movement paths L2 L3, L4 is now explained, referring to FIG. 5(*a*).

Firstly, the corner movement path computing portion 41 computes a movement distance of the torch 26 in the x-axis direction in movement path L2 (x-axis movement distance d1). The high speed loop R (KR) is symmetrical with respect to a center line CL by which a corner angle θ is equally divided into two, as shown in FIG. 5(*a*), so the x-axis movement distance d1 is equal to the movement distance of the torch 26 in cut path L5 direction from position P11 in movement path L4.

That is, the corner movement path computing portion 41 accesses maximum acceleration a1 out of the driving condition data memory 42. The maximum acceleration a1 is the maximum acceleration (predetermined acceleration) to be permitted in order to machine at the feeding speed F set in the machining program in a desired cut shape, and is determined by a specification or durability of the respective axis driving motors 37X, 37Y, . . . 37B, for instance. The corner movement path computing portion 41 accesses the feed speed F set in the machining program PRO1, and computes the moving time t1 for moving the torch 26 on cut path L2 on the basis of Equation 1, changing the feed speed F into cutting speed V.

$$t1 = V/a1 \qquad \text{[Equation 1]}$$

That is, the movement time t1 is time when moving on parabola, decelerating cutting speed V (initial speed) of position P1 at the maximum acceleration a1. Next, the x-axis movement distance d1 is computed from the movement time t1 computed and the cutting speed V on the basis of Equation 2.

$$d1=(V \times t1)/2 \quad \text{[Equation 2]}$$

That is, the x-axis movement distance d1 is a half of the distance when moving at a constant speed of cutting speed V for movement time t1.

Subsequently, the corner movement path computing portion 41 computes the movement distance of the torch 26 in the y-axis direction in movement path L2 (the y-axis movement distance d2). The y-axis movement distance d2 is equal to the movement distance of the torch 26 from position P11 in a direction orthogonal to cut path L5 in movement path L4, in a similar way to the x-axis movement distance d1.

That is, the corner movement path computing portion 41 computes the corner angle θ1 as shown in FIG. 5(a) on the basis of a start point and an end point of linear interpolation in both succeeding machining steps. And, tangent value tg of the corner angle θ1 is computed on the basis of Equation 3 from the corner angle θ1 computed.

$$tg=\tan(\theta \tfrac{1}{2}) \quad \text{[Equation 3]}$$

Furthermore, the y-axis movement distance d2 is computed from the computed tangent value tg and the x-axis movement distance d1 on the basis of Equation 4.

$$d2 = d1\left(\frac{\sqrt{1+8tg^2}-1}{4tg}\right) \quad \text{[Equation 4]}$$

And, the corner movement path computing portion 41 computes radius r2 of cut path L3 from the computed x-axis movement distance d1 and the y-axis movement distance d2 on the basis of Equation 5.

$$r2 = 2 \times \frac{d2^2}{d1} \quad \text{[Equation 5]}$$

Then, computing of the respective movement paths L2 L3, L4 is finished. The corner movement path computing portion 41 transmits the result computed of the x-axis movement distance d1, the y-axis movement distance d2 and the radius r2 to the machining control portion 36, and transmits this effect to the main control portion 30.

Subsequently, the program enters in machining step STP4 of FIG. 4 when the torch 26 cutting the workpiece 70 along cut path L1 reaches position P1, and the machining control portion 36 produces the high speed loop R (KR) along movement paths L2, L3 and L4 already computed, and instructs the driving control portion 37 to move the torch 26, circling along the high speed loop R (KR). Receiving this instruction, the driving control portion 37 transfers a predetermined signal to the X-axis and Y-axis motors 37X and 37Y.

The movement of the torch 26 along the high speed loop R (KR) produced in step STP4 is now explained, referring to FIG. 3 and FIG. 5(b).

At time t0, the torch 26 is moving along cut path L1 in the positive direction of the x-axis at the cutting speed V1 which is almost constant (fine full line), as shown in FIG. 3 and FIG. 5(b) The cutting speed in the x-axis direction (the x-axis speed Vx, shown by a broken line) the same as the cut path L1 is V1, and the cutting speed in the y-axis direction (the y-axis speed Vy, shown by a dashed line) perpendicular to the cut path L1 is zero (0). And, the acceleration a (bold full line) is zero (0) since the above-mentioned cutting speed V is almost constant.

When the torch 26 reaches position PI at point of time t10, the driving control portion 37 transmits a predetermined signal to the X-axis and Y-axis driving motors 37X, 37Y so that the speed of the torch 26 on cut path L2 can be made cutting speed V by decelerating with the maximum acceleration a1. Then, the table 3 and the saddle 6 are moved and driven in a predetermined direction. By doing so, the torch 26 moves along cut path L2, reducing cutting speed V at the maximum acceleration a1, as shown in FIG. 5(b) That is, the torch 26 moves accelerating the y-axis speed Vy while reducing the x-axis speed Vx.

When the torch 26 reaches position P10 at point of time t11 after passing movement time t1 from point of time t10, the reduced cutting speed V becomes V2, and the driving control portion 37 transmits a predetermined signal to the X-axis and Y-axis driving motors 37X, 37Y so as to move the torch 26 on the cut path L3, maintaining the cutting speed V2. Then, the torch 26 moves along computed cut path L3 which is comprised of an arc having radius r2, maintaining cutting speed V2, as shown in FIG. 3. And, the x-axis speed Vx and the y-axis speed Vy are changed by accelerating or decelerating so as to maintain cutting speed V2 which is almost constant The acceleration a maintains almost constant value a2 since the torch 26 moves on the arch at almost constant speed V2.

When the torch 26 reaches position P11 at point of time t12, the driving control portion 37 transmits a predetermined signal to the X-axis and Y-axis driving motors 37X, 37Y so that the speed of the torch 26 on cut path L4 can reach the cutting speed V, accelerating with the maximum acceleration a1 By doing so, the torch 26 moves along cut path L4, accelerating cutting speed V at the maximum acceleration a1, as shown in FIG. 5(b). That is, the torch 26 moves, accelerating both the x-axis speed Vx and the y-axis speed Vy.

The torch 26 returns to position P1 at point of time t13 after passing movement time t1 from point of time t12, and the x-axis speed Vx and the y-axis speed Vy respectively reach V3 and V4, so that cutting speed V can return to cutting speed V1 in cut path L1. That is, the movement of circling along the high speed loop R (KR) by the torch 26 finishes, maintaining feed speed F (30,000 mm/min) instructed in machining step PS12.

The main control portion 30 may instruct the laser beam oscillation control portion 38 to stop output of laser beam during circling movement on the high speed loop R (KR) so as to stop radiating laser beam, so that cutting operation on the workpiece 70 can be stopped in the loop R portion (position P1→P10 →P11→P1) without meaninglessly losing material, and the efficiency of locating a cut shape (such as, a shape of parts to be cut) on the workpiece 70, that is, nesting efficiency can be improved, thereby.

And, the machining program PRO1 proceeds to machining step PS13 a shown in FIG. 3(b), and the machining control portion 36 executes linear interpolation instruction (G01) where the end point is position P2 (x coordinate is 0, y coordinate is −50) in block N5. That is, the machining control portion 36 instructs the driving control portion 37 to move. Receiving this instruction, the driving control portion 37 transmits a predetermined signal to the X-axis and Y-axis driving motors 37X, 37Y. Then, the torch 26 linearly moves to position P2 in the negative direction of the y-axis along the cut path L5, and the workpiece 70 is cut at the feed speed F maintained.

And, the main control portion 30 executes the automatic producing program JSP which is the sub routine of the high speed loop R program KLP during cut machining so as to automatically produce the high speed loop R (KR) concerning the corner between machining steps PS13, PS14. Furthermore, the torch 26 moves, circling along the high speed loop R (KR) automatically produced so as to cut the corner between machining steps PS13 and PS14. Furthermore, the processing similar to the above-mentioned is executed on the corner between the machining steps PS14 and PS15.

Subsequently, the program enters in machining step PS15, and the machining control portion 36 executes linear interpolation instruction (G01) where the end point is position P4 (x coordinate is −50, y coordinate is 0) in block N7. When the torch 26 reaches position P4, the machining control portion 36 instructs the laser beam oscillation control portion 38 to stop output of laser beam, so that the radiation of laser beam is stopped.

And, the program proceeds to machining step PS16 on the bottom, and the main control portion 30 receives a cancel instruction, and then, the high speed loop R program KLP finishes. And, the machining program PRO1 finishes, and cutting in cut shape SK which is a rectangle finishes.

The present invention can be applied to the corner where the corner angle θ varies from 0° to 180° (sharp corner). Even if the corner angle θ is right angle θ2 (FIG. 6(a)), obtuse angle θ3 (FIG. 6(b)), or acute angle θ4 (FIG. 6(c)), the above-mentioned high loop R program KLP is executed, so that the corner movement path computing portion 41 can compute x-axis and y-axis movement distance d1, d2 and radius r2 according to each corner angle θ and the torch 26 can move, circling on the high speed loop R (KR) automatically produced. Explanation concerning FIG. 6 is omitted since the same reference number is attached to an element in FIG. 6 the same as element in FIG. 4.

In the laser beam machine 1 of the present embodiment, the sharp corner judgment portion 40 judges that a corner is a sharp corner, and the machining control portion 36 moves the torch 26, accelerating and decelerating with maximum acceleration a1 along the high speed loop R (KR) automatically produced as additional locus for producing sharp corner, and the sharp corner is cut, extremely maintaining the feed speed F set in the machining program PRO1, so that the path circling outside the cut shape SK can be made the high speed loop R (KR) shorter than a conventional loop R (LR), and speedy cut machining can be thereby actualized, maintaining good cut face having no machining irregularity. In case where the cut shape has specifically many sharp corners to be machined, more speedy cut machining is possible.

The machining control portion 36 continues the high speed loop R program KLP until a cancel instruction is instructed in the machining program PRO1. Therefore, the workpiece is automatically cut along a movement path shorter than a conventional one by inserting both high loop R instruction and cancel instruction in the machining program KLP even if cut shape has many sharp corners to be machined, and speedy cut machining can be easily realized without longer time, thereby. Besides, no program capacity for the loop R program LRP is necessary. So, it is not necessary to newly add the program capacity even if the cut shape has many sharp corners to be machined.

In the above-mentioned embodiment, the judgment of sharp corner concerning a corner between both succeeding machining steps is executed before execution of the machining step in advance for all of the corners. But, it is sufficient to simply judge before the torch 26 reaches the sharp corner. For example, the above-mentioned judgment may be executed just before execution of each machining step Besides, the high speed loop R (KR) can be automatically produced at any time, not only during cutting machining as long as the loop can be automatically produced before the torch 26 reaches the sharp corner. For instance, the high speed loop R (KR) may be automatically produced for all the corners before cutting machining in advance.

In the above-mentioned embodiment, the high speed loop R program KLP is executed in all of the machining steps of the machining program PRO1, but this method is not limiting. The high speed loop R program KLP may be inserted in a predetermined machining step of the machining program PRO1 so as to execute. For instance, the high speed loop R program KLP may be executed concerning only a predetermined shape of parts of a plurality of shapes of parts nested on the workpiece 70.

Furthermore, an operator may select the loop R program LRP of circling on the loop R (LR) according to the conventional machining method or the high speed loop R program KLP according to the invention by a predetermined G code. In the above-mentioned embodiment, an operator directly produces the machining program PRO1. But, this method is not limiting. The invention can be also of course applied to such method that data concerning shape of parts produced by CAD/CAM device in advance is inputted in the control unit 1c.

The above-mentioned embodiment refers to the high speed loop R having a parabola (quadratic curve). But, any curve, such as tertiary curve and arc of ellipse, is available as the high speed loop R as long as the cut paths in the sharp corner are smoothly connected with each other, and the torch can move on the curve, accelerating or decelerating at a predetermined acceleration a1. Besides, any arc of the high speed loop R, such as arc of ellipse, is available as long as movement paths are smoothly connected with each other, and the torch can move at reduced cutting speed on the arc. In the above-mentioned embodiment, the high speed loop R is symmetrical with respect to center line CL, but it is not limiting. But, it is not symmetrical with respect to center line CL.

In the embodiment, the workpiece 70 in the shape of a plate is machined. But, any shape of workpiece, such as solid cut shape, is also available as long as cut shape has the sharp corner. In this case, the invention can be applied by properly driving the Z-axis, A-axis and B-axis driving motors 37Z, 37A and 37B.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

What is claimed is:

1. A laser beam machine,
   a radiating means for radiating laser beam on a workpiece to be cut;
   a means for moving and driving, for moving and driving said radiating means at predetermined feed speed;
   a machining execution means for moving and driving said radiating means through said means for moving and driving on the basis of a movement instruction instructed by a machining program;

a sharp corner judgment means for judging as to whether a corner of cut shape in said workpiece is a sharp corner or not on the basis of said machining program;

additional locus producing means for producing sharp corner, for producing additional locus for producing sharp corner when machining a corner which is judged as said sharp corner by said sharp corner judgment means; and a sharp corner machining execution means for machining said corner judged as said sharp corner on the basis of said additional locus for producing sharp corner produced by said additional locus producing means for producing sharp corner.

2. The laser beam machine according to claim 1, wherein said sharp corner machining execution means controls feed speed of said radiating means so as to move said radiating means, decelerating feed speed from the feed speed before entering into said sharp corner, from passing of said corner till returning to said corner by said radiating means.

3. The laser beam machine according to claim 1, wherein a sharp corner machining execution judgment means for judging as to whether a machining execution instruction of said sharp corner is instructed in said machining program or not is provided, whereby machining on said corner is executed by said sharp corner machining execution means when said sharp corner machining execution judgment means judges that said machining execution instruction of said sharp corner is instructed in said machining program.

4. The laser beam machine according to claim 1, wherein a laser beam radiation control means for controlling radiation of said laser beam on said workpiece from said radiating means is provided, whereby no laser beam is radiated on said workpiece through said radiating means by said laser beam radiation control means while said sharp corner machining execution means moves and drives said radiating means along said additional locus for producing sharp corner.

5. The laser beam machine according to claim 2, wherein said sharp corner machining execution means controls said feed speed of said radiating means by executing the following control in order from passing of said corner till returning to said corner by said radiating means;

a) decelerating control for decelerating said feed speed of said radiating means from the feed speed before entering said sharp corner;

b) constant speed control for moving said radiating means at constant speed lower than said feed speed before entering into said sharp corner; and c) accelerating control for accelerating said feed speed of said radiating means from a state of said constant speed control up to said feed speed instructed when getting out of said sharp corner.

6. A laser beam machine, comprising:

a radiating unit for radiating laser beam on a workpiece to be cut;

a unit for moving and driving, for moving and driving said radiating unit at predetermined feed speed;

a machining execution unit for moving and driving said radiating unit through said unit for moving and driving on the basis of a movement instruction instructed by a machining program;

a sharp corner judgment unit for judging as to whether a corner of cut shape in said workpiece is a sharp corner or not on the basis of said machining program;

additional locus producing unit for producing sharp corner, for producing additional locus for producing sharp corner when machining a corner which is judged as said sharp corner by said sharp corner judgment unit; and a sharp corner machining execution unit for machining said corner judged as said sharp corner on the basis of said additional locus for producing sharp corner produced by said additional locus producing unit for producing sharp corner.

7. The laser beam machine according to claim 6, wherein said sharp corner machining execution unit controls feed speed of said radiating unit so as to move said radiating unit, decelerating feed speed from the feed speed before entering into said sharp corner, from passing of said corner till returning to said corner by said radiating unit.

8. The laser beam machine according to claim 6, wherein a sharp corner machining execution judgment unit for judging as to whether a machining execution instruction of said sharp corner is instructed in said machining program or not is provided, whereby machining on said corner is executed by said sharp corner machining execution unit when said sharp corner machining execution judgment unit judges that said machining execution instruction of said sharp corner is instructed in said machining program.

9. The laser beam machine according to claim 6, wherein a laser beam radiation control unit for controlling radiation of said laser beam on said workpiece from said radiating unit is provided, whereby no laser beam is radiated on said workpiece through said radiating unit by said laser beam radiation control unit while said sharp corner machining execution unit moves and drives said radiating unit along said additional locus for producing sharp corner.

10. The laser beam machine according to claim 7, wherein said sharp corner machining execution unit controls said feed speed of said radiating unit by executing the following control in order from passing of said corner till returning to said corner by said radiating unit;

(a) decelerating control for decelerating said feed speed of said radiating unit from the feed speed before entering said sharp corner;

(b) constant speed control for moving said radiating unit at constant speed lower than said feed speed before entering into said sharp corner; and (c) accelerating control for accelerating said feed speed of said radiating unit from a state of said constant speed control up to said feed speed instructed when getting out of said sharp corner.

* * * * *